United States Patent [19]

Cunningham

[11] Patent Number: 4,945,427

[45] Date of Patent: Jul. 31, 1990

[54] MAGNETIC DISK RECORDING WITH VARIABLE TRACK WIDTH AND VARIABLE TRACK DENSITY

[75] Inventor: Earl A. Cunningham, Rochester, Minn.

[73] Assignee: International Business Machines Corporation, Armonk, N.Y.

[21] Appl. No.: 206,076

[22] Filed: Jun. 13, 1988

[51] Int. Cl.$^5$ .................. G11B 21/21; G11B 20/20
[52] U.S. Cl. ................................. 360/75; 360/76; 360/103; 360/106
[58] Field of Search .............. 360/75, 76, 102, 103, 360/106, 109

[56] References Cited

U.S. PATENT DOCUMENTS

| | | | |
|---|---|---|---|
| 3,384,880 | 5/1968 | Duinker et al. | 360/106 |
| 3,855,625 | 12/1974 | Garnier et al. | 360/103 |
| 4,388,655 | 6/1983 | Zenzefilis | 360/19.1 |
| 4,479,156 | 10/1984 | Kumagai et al. | 360/104 |
| 4,486,798 | 12/1984 | Feliss et al. | 360/103 |
| 4,633,343 | 12/1986 | Maury et al. | 360/76 |

FOREIGN PATENT DOCUMENTS 0041138 12/1981 European Pat. Off. .
57-105805 7/1982 Japan .
61-208615 9/1986 Japan .

OTHER PUBLICATIONS

J. S. Heath, Design of a Swinging Arm Actuator for a Disk File, IBM Journal of Research and Development, vol. 20, No. 4, pp. 389-397, Jul 1976.

IEEE Transactions on Magnetics, vol. Mag-22, No. 5, pp. 1028, 1029 & 1030, Sep. 1986, Entitled "A Uniform Flying Height Rotary Actuator Air Bearing Slider".

Primary Examiner—Donald McElheny, Jr.
Assistant Examiner—David L. Robertson
Attorney, Agent, or Firm—F. A. Sirr; Robert W. Lahtinen

[57] ABSTRACT

A magnetic recording apparatus and method for the constant frequency recording of concentric data tracks on a magnetic recording disk in a manner to provide continuously reducing track width and continuously reducing track-to-track spacing from the disk's inner track to the disk's outer track. A magnetic recording head moves on a path from the disk's inner track to the disk's outer track. The head's gap-to-radius skew increases as the head moves from the inner track to the outer track. Thus, the gap's width-projection onto a disk radius at the location of each track continuously decreases in length, from the inner track to the outer track. As the track width progressively decreases, the track-to-track spacing also decreases, to thereby provide higher track density at the disk's outer tracks. A flying head having a parallelogram shaped slider is described, allowing use of the invention in non-contact recording.

9 Claims, 3 Drawing Sheets

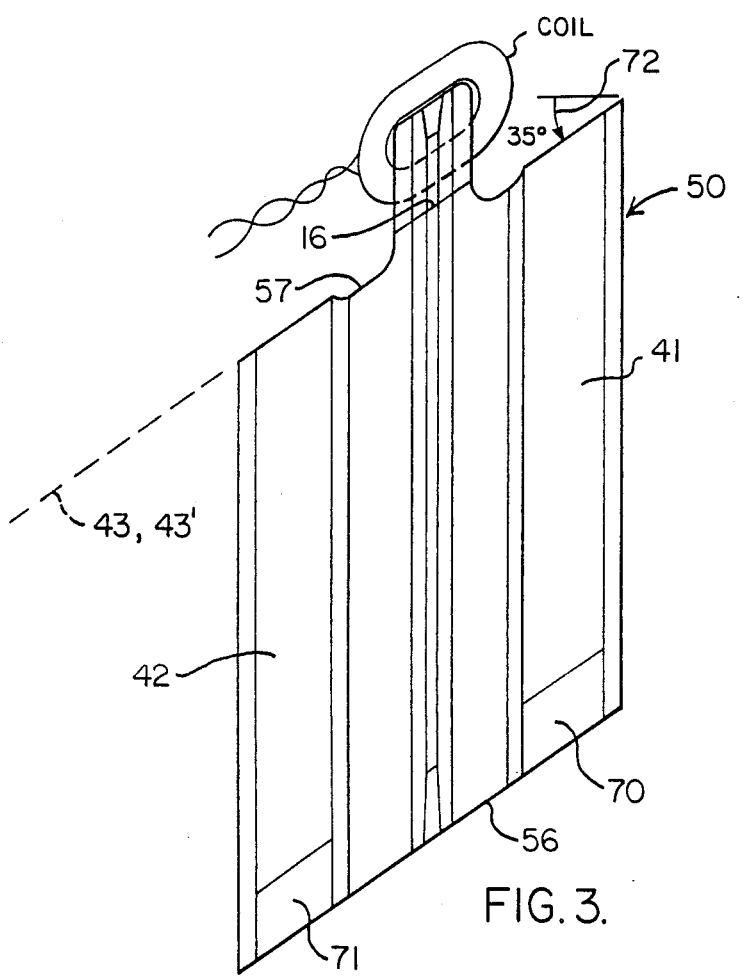

MAGNETIC DISK RECORDING WITH VARIABLE TRACK WIDTH AND VARIABLE TRACK DENSITY

FIELD OF THE INVENTION

The present invention relates to the field of magnetic recording, and more specifically to the field of recording on magnetic disks.

BACKGROUND OF THE INVENTION

In the constant frequency method of recording (CFR) on a magnetic disk, the disk's angular velocity (RPM) is held constant, and data is supplied to a recording head at a constant binary data rate (bits per second or bps). This method of recording produces a linear data density (bits per linear track unit length) that varies inversely with track radius. That is, linear recording density is greatest at the disk's inner track. The recording capability of a given recording head and magnetic media can therefore be maximized only at the inner track.

Various methods have been used to more fully utilize the head/media recording capability.

One prior art method is to decrease the disk's RPM as the head moves radially outward of the disk, so that a constant surface speed exists between the head and the disk with increased track diameter. When data is recorded at a constant data rate, constant density recording (CDR) results. As a result, utilization of the head/media recording capability can be maximized.

This method is difficult to practice, however, due to the high inertia of a rotating disk, particularly where the disk is a hard disk, and the resulting difficulty in rapidly changing the disk's RPM in a random access environment.

Another prior art method involves providing bands of recording tracks, and changing of the data rate for each recording band. In this method, each band's data rate or frequency is chosen such that at the inner track of each band the head/media capability is maximized. A disadvantage of this method is that different data channel characteristics must be provided for each of the different frequency bands.

While such prior art methods increase utilization of the head/media to some extent, complex disk drive means must be provided to quickly change the disk's RPM, or multi frequency data channels must be provided.

The present invention practices CFR (i.e. constant data rate and disk RPM recording), by making use of a magnetic recording head whose generally linear gap is skewed, in a continuously increasing manner, to the disk radius at the location of each disk track, from the inner to the outer track, and wherein the disk's radial track density is caused to increase as the written track widths become narrower.

The present invention provides a major portion of the increase in capacity produced by a variable RPM CDR system. However, the present invention does not require a change in disk RPM.

The present invention produces a capacity increase comparable to a 3 band frequency system. In practice, using the well known ferrite heads, the advantages of a multi-frequency system is degraded by the head's failure to optimally perform at the different frequencies. The variable track density system of the invention is not degraded in this manner, and thus provides comparable benefits, while not requiring multiple frequency data channels.

U.S. Pat. No. 4,388,655 is of interest relative the concept of a skewed head gap. This patent is directed to a arrangement for improving the density and fidelity of video recording. In accomplishing the objects of this patent, it is taught that the recording head(s) be moved along a path that is non-radial of the disk. Curved paths and linear paths are suggested for head movement. However, in all cases the teachings of this patent are (1) that the skew of the head gap to the disk radius should preferably remain constant, and (2) when the head(s) move along a linear path, a spiral track is written whose track-width becomes wider as the head(s) is moved from the inner disk diameter to the outer disk diameter.

As will be apparent, these two requirements are opposite to the requirements of the present invention, and do not provide for reduced track width and reduced track spacing, from the disk's inner track to the disk's outer track.

Skewed recording, also called azimuth recording, is known in the video recording arts, where adjacent tracks are recorded with heads of opposite gap skew. U.S. Pat. No. 4,479,156 is an example. In this type of recording, the gap skew remains constant for each head across all corresponding tracks.

A feature of the present invention provides a unique air bearing head slider having a generally parallelogram shape, wherein the slider's rails extend more nearly perpendicular to disk radii, and wherein the skewed head gap is generally parallel to the slider's leading/trailing edges. This feature allows use of the invention in the art of rigid disks, where non-contact recording is necessary.

U.S. Pat. No. 4,486,798 discloses an air bearing head of the conventional rectangular shape, where the slider's rails and the head gap are skewed to the disk's tangential velocity vector line. In the device of this patent, the head moves along a disk radius. Thus, the gap skew remains constant from track to track.

The concept of a rectangular shaped air bearing slider head whose slider contour facilitates flying with a slider skew angle is described in the publication *IEEE Transactions on Magnetics*, Vol. Mag-22, NO.5, September 1986, in an article entitled "A UNIFORM FLYING HEIGHT ROTARY ACTUATOR AIR BEARING SLIDER", by J. W. White. This head provides small angle side tapers on the flying rails of a conventional rectangular shaped slider head. These side tapers are similar to the head's leading edge tapers, and they allow a partially lateral direction of flight of the slider relative a disk radius.

SUMMARY OF THE INVENTION

The present invention utilizes CFR, and maximizes use of the head/media capacity by increasing the disk's track density as a function of track radius. The lower linear density achieved with CFR near the outer radius of the disk is compensated for by providing a higher track density at outer disk radii as compared to inner disk radii.

By way of example, the present invention provides up to about a 35 percent increase in recording capacity over CFR having uniform head skew (usually intended to be zero) and uniform track spacing or pitch from track to track.

The present invention makes use of the principle that a magnetic head whose gap is skewed relative the direction of head travel provides a narrow apparent gap width, and therefore writes a narrow track.

In accordance with the invention, a skewed-gap head is moved on a path across the disk in a manner to provide progressively increasing gap skew, and thereby progressively narrower tracks, as the head moves from the disk's innermost to its outermost track.

Since the disk's tracks are written progressively narrower from the inner to the outer track, the motor means that moves the head is constructed and arranged to move the head so as to provide track-to-track steps whose radial component is progressively smaller, as the head moves from the inner to the outer track.

The use of CFR allows the same number of data blocks (sectors) to be recorded on each track, while the variable radial track density of the invention provides a higher capacity for recording data on the disk.

In this way, head/media CFR capacity is maximized only at the expense of providing servo means that will produce reduced track-to-track step movement, as the head steps from the inner toward the outer track.

When the present invention is applied to a disk file having rigid or hard disks, it is necessary that the head include a slider that enables the head to fly relative the disk's recording surface.

Conventional head fabrication techniques for flying heads require that head's gap be generally parallel to the leading/trailing edges of the head slider.

In a conventional slider head, the slider is of a generally rectangular shape, and the head is mounted so that the slider rails extend generally perpendicular to the track radius.

When such a rectangular shaped slider head is mounted with its gap skewed in accordance with the present invention, the attitude of the rails change relative to the track radius, and the flying characteristics of the slider are disturbed.

While a rectangular shaped slider head constructed in accordance with the teachings of the above mentioned article by J. W. White, which is intended to allow significant slider skew angles to exist without significantly disturbing the flying characteristics of the head, may be used with the present invention, the parallelogram shaped head of the present invention is an improvement thereover.

In accordance with a feature of the invention, a slider head of more conventional slider edge fabrication is constructed with its gap generally parallel to the slider's leading/trailing edges. However, in accordance with this feature of the invention, the slider is of generally parallelogram shape. With this construction and arrangement, the head gap can be skewed relative the disk radius, as is required by the invention. However, the rails of the slider remain positioned in the conventional manner (i.e. generally perpendicular to the disk radius), and the flying characteristics of the head are not disturbed.

The invention will be described with reference to the recording of concentric data tracks. However, the invention also finds utility, for example, in the recording of a spiral track, and the scope and content of the invention includes the recording of such other track formats.

These and other features and advantages of the present invention will be apparent to those of skill in the art upon reference to the following description of preferred embodiments thereof.

BRIEF DESCRIPTION OF THE DRAWING

FIGS. 3 and 4 are an enlarged disk-side (i.e. under side) view and an enlarged trailing end view, respectively, of the parallelogram head of FIG. 2.

DETAILED DESCRIPTION OF THE INVENTION

The present invention finds utility in disk drives or files of many detailed configurations, including floppy disk drives and hard or rigid disk drives having various disk diameters.

In addition, the reduction in track-to-track spacing that is provided by the present invention can be implemented in a number of ways known to those skilled in the art.

For example, a stepping motor servo may be provided to move the head, open loop, through smaller and smaller steps, as the head moves from the inner track toward the outer track. This can be implemented, for example, by the use of cam driven mechanical leverage arrangements that are operable to move the head in either direction during a track seek or access operation.

By way of another example, the disk itself may be formatted so as to contain a track identifier and a tracking servo pattern for each individual track. When this is done, a closed loop head moving servo moves the head to seek an identified target track, under servo input command. The head then reads track identifiers as it moves generally radially across the disk, providing a feedback signal that allows the proper head velocity and acceleration motion profile to be established, so that the servo stops moving the head, and the head centers on the target track. For optimum servo performance, the variable track density of the invention should be taken into account in determining the servo system parameters to be used during a track access operation. When this closed loop arrangement is used, formatting of the disk provides tracks of the required decreased spacing from the disk's inner track to its outer track.

The details of construction of disk drives in which the invention finds utility are well known to those of skill in the art. As a result, the following description provides only such detail as is necessary to teach the best mode of the present invention, and as is necessary to enable those skilled in the art to practice the present invention.

Figure 1:
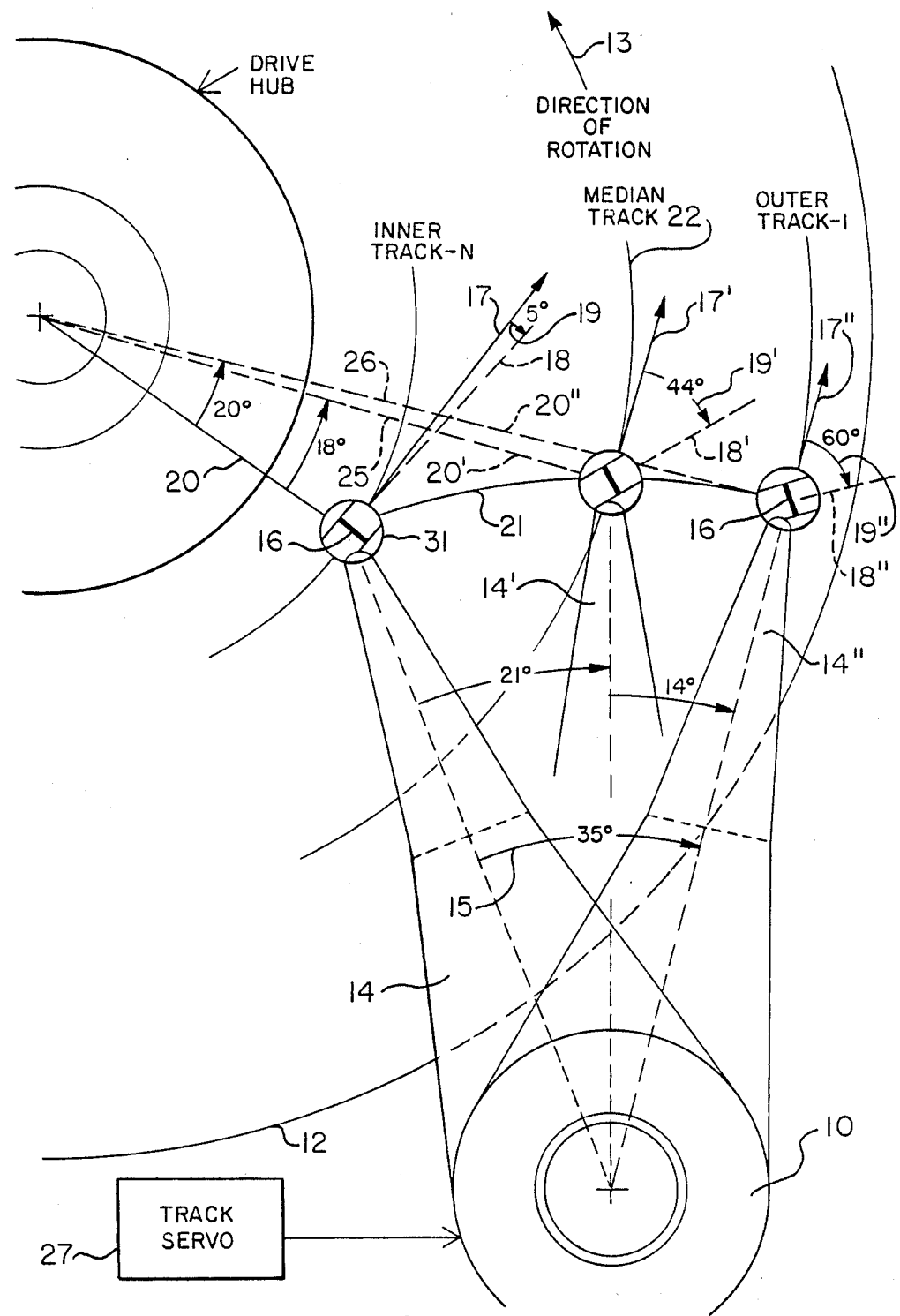
FIG. 1 shows a contact recording rotary actuator embodiment of the invention having a head-gap to disk-radius skew that changes from about 5 degrees at the disk's inner track to about 60 degrees at the disk's outer track.

FIG. 1 shows a top view of an embodiment of the invention which, without limitation thereto, is a contact recording disk drive having a button type head 31. For example, the disk drive is a floppy disk drive. This embodiment of the invention moves the disk drive's read/- write head 31 in an arc by virtue of operation of a rotary actuator means or motor 10.

While the invention finds utility with a variety of heads and head actuator means known to those skilled in the art, a requirement of the invention is that the head gap be oriented, and that the head be moved, so as to transduce tracks of decreasing track width, from the disk's inner track-N to its outer track-1, and that track-to-track spacing decrease, from the disk's inner track-N to its outer track-1

Since a magnetic recording head's read/write efficiency increases as a function of head/media velocity, the transducing of narrower tracks at the disk's outer radii is compensated for, providing good signal to noise ratio throughout all disk tracks.

A portion of a magnetic recording disk is shown at 12. As stated, this disk may be either a floppy disk or a hard disk, and it is of well known physical dimensions. FIG. 1 is a top view of disk 12. The disk is rotated CCW, see arrow 13, at a substantially constant angular velocity by means of a drive motor, not shown.

Rotary actuator means 10 includes a swing arm 14 that is bidirectionally movable through a limited arc, for example 35 degrees, see arrow 15. Head 31 and a head suspension means (not shown) are mounted on arm 14. FIG. 1 shows the generally linear gap 16 of head 31. The physical dimensions of gap 16 are greatly exaggerated in the figure.

Swing arm 14 is shown in three of its numerous operating positions. Position 14 is the position that arm 14 occupies when transducing the disk's inner track-N; position 14' is the position the arm occupies when transducing the disk's median track 22; and position 14" is the arm's position when transducing outer track-1 Arm 14 rotates through a 21 degree arc when moving from the disk's inner track-N to the disk's median track 22, and rotates an additional 14 degrees when moving from the median track to the disk's outer track-1.

Arrow 17 identifies the tangential velocity vector line of the disk's rotational velocity at the location of the disk's inner track-N. Dotted line 18 is a line that passes through the center of gap 16 and is perpendicular to the gap. Numerals 17', 17", 18' and 18" identify corresponding parameters at the location of the disk's median track 22 and its outer track-1.

As can be seen from FIG. 1, gap 16 is rotated or skewed CW relative to vectors 17,17',17" by an angle identified as 19,19',19". The disk radii at track-N, at median track 22, and at track-1 is identified at 20,20,'20", respectively.

Actuator 10 bidirectionally moves head 31 and its gap 16 along an arc 21 that is non-radial of disk 12. As can be seen from FIG. 1, the projection of gap 16 onto disk radii 20,20',20" results in an inner track-N, a median track 22, and an outer track-1 whose width is always less than the length of gap 16, and whose width progressively decreases from the disk's inner track-N to its outer track-1.

The construction and arrangement of this invention by which gap skew changes with head movement is such that the disk's track width progressively decreases, from the disk's inner track to its outer track. The exemplary CCW direction of disk rotation, and/or CW direction of gap skew change or rotation relative the disk radii, are not to be taken as a limitation on the present invention.

In this exemplary showing, at median track 22, gap skew angle 19' has increased from the 5 degrees at track-N, to 44 degrees at the median track. At track-1, skew angle 19" has again increased to 60 degrees, and the skew angle is at its maximum value. It should be noted that the skew angle has increased in the same sense, in this case CW, and the skew angle has not passed through zero. When these skew angles are projected on disk radii 20, 20' and 20", respectively, it can be seen that the track width progressively decreases from track-N, to the median track, to track-1.

The exemplary gap skew angles shown in FIG. 1 yield about a 35 percent increase in capacity over a standard CFR design.

A secondary advantage of providing a skewed gap 16 is that any scratches that may be on the disk's surface, for example scratches caused by the head moving across the disk during manufacture of the disk file, do not extend in the linear direction of gap 16. In such a situation, the gap skew minimizes problems associated with signal modulation. It is noted from FIG. 1 that median track 22 is physically closer to track-1 than it is to track-N. In accordance with the invention, the disk's tracks are written, under the control of track servo 27, with progressively less track-to-track spacing, from inner track-N to outer track-1. Track servo 27 may be either an open loop or a closed loop servo. While not critical to the invention, the well known guard band between adjacent tracks preferably remains uniform throughout the disk.

In a linear actuator embodiment of the invention (not shown), the head that includes gap 16 is bidirectionally moved by a linear actuator along non-radial path. Again, the skew of gap 16 at track-N results in a continuous reduction in track width from inner track-N to outer track-1, and the track servo, which may be either a closed loop or an open loop servo, produces tracks having continuously reduced spacing from track-N to track-1.

It is also within the scope of the invention to provide for radial head movement, where the head gap rotates with such movement, to thereby transduce tracks of progressively decreasing width, from the disk's inner track to its outer track.

While it is preferred that the track spacing continuously reduce from track-N to track-1, an application may exist where the reduction in track spacing is banded or zoned, or the track-N to track-1 format may be continuous, as in the form of a spiral. All such well known track arrangements and formats are to be considered within the scope and content of the term "continuously reduced spacing".

Figure 2:
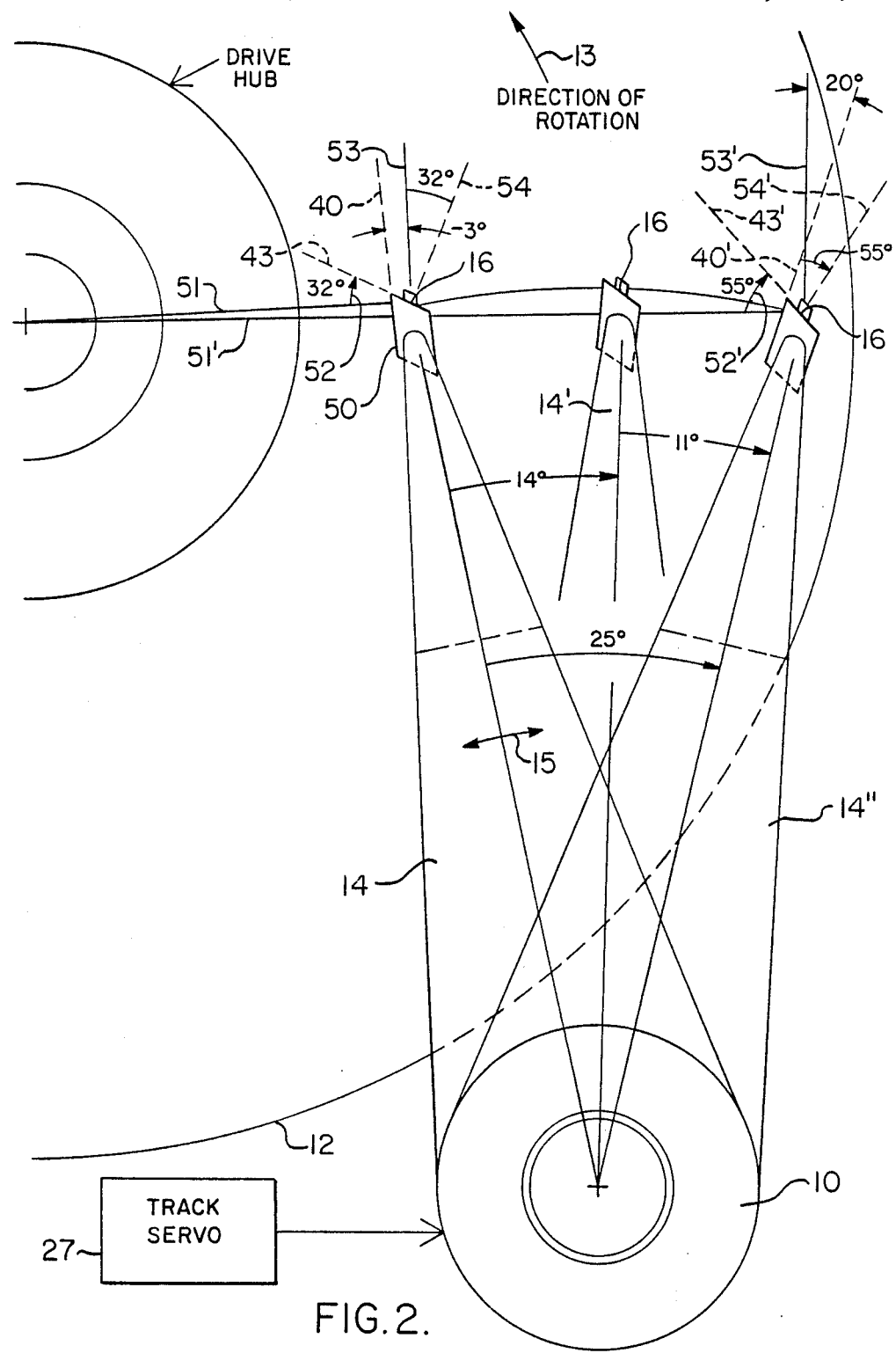
FIG. 2 shows a flying head, non-contact recording, rotary actuator embodiment of the invention wherein the head gap skew changes from about 32 degrees at the disk's inner track to about 55 degrees at the disk's outer track, and wherein a parallelogram shaped flying head slider, whose leading/trailing edges are angled about 35 degrees CW off of a rectangular shape (as viewed from above), is mounted so as to provide slider rails that are skewed about −3 degrees (i.e. CCW) from the perpendicular to a disk radius at the inner track, and are skewed about +20 degrees (i.e. CW) from the perpendicular to a disk radius at the outer track.

FIGS. 2, 3 and 4 show an embodiment of the invention utilizing a flying head 50. The unique head/slider configuration shown in these figures provides a new and unusual means for producing the above mentioned head gap skew, while maintaining the head's conventional air bearing characteristics. In its broadest sense, the scope of the invention is not to be limited to this unique head/slider configuration.

FIG. 2 does not show inner track-N, median track 22, nor outer track-1 of disk 12. However, it is to be understood that the positions shown for arm 14 (i.e. positions 14, 14' and 14") correspond to the transducing of these respective tracks by head 50.

Rotary actuator means 10 is shown connected to move arm 14 on which head 50 is mounted. Three positions of arm 14 are shown. In position 14, head 50 is positioned to transduce the disk's inner track-N. In position 14', the head is transducing the disk's median track 22, and in position 14″ the head is transducing the disk's outer track-1. Arm 14 moves 14 degrees when moving from the disk's inner track to its median track, and moves an additional 11 degrees when moving from the disk's median track to its outer track.

In FIG. 2, line 51 represents the disk's radius at the location of the disk's inner recording track-N, and line 51′ represents the disk's radius at outer track-1.

Lines 53,53′ of FIG. 2 represent the tangential velocity vector at the inner and outer disk tracks, respectively. Lines 54,54′ extend normal to gap 16 at the location of these two tracks.

Head gap 16 is skewed to disk radii 51,51′ by the angle 52,52′ at the location of these two disk tracks, respectively. In this exemplary showing, angle 52 is about 32 degrees, and angle 52′ is about 55 degrees. The corresponding angle, when the head is positioned at the disk's median track (i.e. arm position ′), is of a value intermediate 32 degrees and 52 degrees.

Lines 40,40′ of FIG. 2 extend parallel to flying rails 41 and 42 of head 50. These rails are best seen in FIGS. 3 and 4. In this embodiment of the invention, rails 41,42 are oriented −3 degrees (i.e. CCW from) the tangential velocity vector 53 at the location disk's inner track-N, and are oriented +20 degrees (i.e. CW from) the tangential velocity vector 53′ at the location of the disk's outer track-1.

Lines 43,43′ of FIG. 2, one of which corresponds to the location of track-N and the other of which corresponds to the location of track-1, are parallel to and coincident with the slider's trailing edge, and are parallel to head gap 16. This trailing edge is best seen in FIG. 3. The angle between this trailing edge and radii 51,51′ varies between 32 degrees at the location of the disk's inner track, and 55 degrees at the location of the disk's outer track.

The geometry shown in FIG. 2 is generally of the type found in small diameter rigid disk drives or files. By way of example, disk 12 of FIG. 2 may be a 3½ inch diameter rigid disk.

With reference to FIGS. 3 and 4, the slider of head 50 is of conventional detailed construction and arrangement, with the exception that the slider is of a generally parallelogram shape (i.e. the side of the slider that faces the disk, shown in FIG. 3, is of a parallelogram shape). This unique shape allows head 50 to be nearly conventionally fabricated, i.e. in groups of rows and columns of heads, where the heads are formed by angled cuts different than the typical 90 degree cuts, in a manner what will be readily understood by those skilled in the art.

The slider's two linear flying rails 41,42 are generally parallel to each other. The leading ends of the rails terminate in generally linear leading edge 56. The trailing ends of the rails terminate in generally linear trailing edge 57. The leading ends of the rails are provided with leading edge tapers 70,71. The sides of the rails are provided with standard angled edges (not numbered). The leading/trailing edges 56,57 extend at an angle 72 of about 35 degrees (as measured opposite the direction of disk rotation) to the direction in which rails 41,42 extend. Gap 16 is generally parallel to the slider's leading edge 56 and its trailing edge 57.

This new and unusual slider construction and arrangement for head 50 allows substantially conventional head fabrication techniques to be used, and yet provides a head having a skewed gap 16. With this construction and arrangement, the slider's flying characteristics remain substantially undisturbed due to the direction in which rails 41, 42 extend relative velocity vectors 53,53′.

With the construction and arrangement of this invention, the flying characteristics of skewed gap head 50 are substantially the same as those of a conventional rectangular shaped head slider where the head gap is not skewed.

The slider construction and arrangement, and the manner of moving the head, above described provide a normal head flying height at the inner tracks. At the outer tracks, where the head would normally fly higher due to the higher relative velocity between the head and disk, the head of the invention flies at about the same height as at the inner tracks, due primarily to the rotation, or change in angle of attack, of the flying rails that occurs as the head moves toward the disk's outer tracks.

It is to be noted that in the embodiments of the invention above described, the variation that occurs in the skew of the head gap to disk radii is composed of two components. The first component is the direct angular rotation of the head gap by virtue of rotation of actuator means 10. The second component, which is indirectly produced by actuator means rotation, is due to a change in the angle of the disk radius that extends through the head gap at the location of each disk track.

Those skilled in the art, when faced with the design of a disk file of a particular geometry, will readily find that the invention can be applied to the particular geometry by making use of these two component effects, to thereby provide the needed gap rotation or skew as the head moves across the disk.

While the present invention has been described with reference to preferred embodiments thereof, other embodiments will be apparent to those of skill in the art, and the scope and content of the invention is to be limited only by the following claims.

What is claimed is:

1. A method of recording on a magnetic recording disk, said disk having a plurality of recording tracks, the inner track of which is designated track-N, and the outer track of which is designated track-1, comprising;
   rotating said disk,
   providing a recording head having a generally linear recording gap,
   providing head mounting means operable to move said head between track-N and track-1 in a manner to cause said head gap to be skewed to a radius of the disk at each of said tracks, said skew continuously varying in the same sense as said head moves from track-N to track-1 in a manner to cause to be recorded of continuously reduced track width from track-N to track-1,
   continuously reducing the track-to-track spacing as said head moves from track-N to track-1,
   wherein said head is a flying head having a slider, and
   providing a generally parallelogram shaped slider having oblique and acute internal angles, and having generally parallel flying rails, and whose parallelogram shaped outside leading corner is located in advance of said inside leading corner.

2. The method of claim 1
   wherein said gap extends generally parallel to a generally straight slider leading edge that joins said inside and outside leading corners.

3. The method of claim 2 wherein said gap extends at an angle of about 35 degrees to a line that extends perpendicular to said flying rails, as measured opposite the direction of disk rotation.

4. A method of using a recording head to record data on a recording disk, said disk having a plurality of recording tracks, the inner track of which is designated track-N, and the outer track of which is designated track-1, comprising;

recording data tracks having (1) continuously reducing track width, and (2) continuously reducing track-to-track spacing from track-N to track-1, wherein said head is a flying head having a slider, and providing a generally parallelogram shaped slider having oblique and acute internal angles, as viewed from said disk, said slider having a pair of generally parallel spaced flying rails, the outer rail of which leads the inner rail, as viewed from said disk.

5. The method of claim 4 wherein the leading ends of said flying rails define a generally linear leading edge for said slider, and wherein said gap is generally parallel to said leading edge.

6. The method of claim 5 including the step of orienting said gap at an angle of about 35 degrees to a line that extends perpendicular to said flying rails, as measured opposite the direction of disk movement.

7. Disk drive apparatus, comprising; a recording disk and means for rotating said disk, head means having a generally linear transducing gap, movable means mounting said head, said movable means being movable between an inner track and an outer track of said disk in a manner to cause said head gap to be skewed to a radius of the disk at each of said tracks, said skew continuously varying in the same sense as said head moves from said inner track to said outer track, so as to cause tracks to be recorded of continuously reducing track width from said inner track to said outer track, servo means controlling movement of said movable means in a manner to move said head a continuously reduced distance between adjacent tracks, as said head moves from said inner track to said outer track, and said head being a flying head having a generally parallelogram shaped slider having oblique and acute internal angles, said slider having a plurality of parallel flying rails whose leading ends terminate in a generally linear leading slider edge, the outer corner of said leading edge being located so as to lead the inner corner of said leading edge, as said corners are viewed from said disk.

8. The method of claim 7 wherein said head is a flying head having a generally parallelogram shaped slider facing said disk, said slider having generally parallel flying rail means facing said disk, and wherein said linear gap extends at an angle of about 35 degrees to a perpendicular to said flying rails, as measured opposite the direction of disk rotation.

9. Constant frequency recording disk drive apparatus, comprising;

a recording disk and means for rotating said disk, flying head means cooperating with said disk and having a generally linear transducing gap, rotary actuator means including an arm having one end thereof pivotally mounted and having said head means mounted on an opposite end thereof, said arm being pivoted through an angle of about 25 degrees as said head means moves between an innermost track and an outermost track of said disk, said transducing gap being skewed to a radius of said disk at said innermost track by an angle of about 32 degrees, said skew continuously varying in the same sense as said head means moves from said innermost track to said outermost track, said said transducing gap being skewed to a radius of said disk at said outermost track by an angle of about 55 degrees, so as to cause tracks to be recorded of continuously reducing track width from said innermost track to said outermost tracks, and servo means controlling rotation of said arm in a manner to move said head means a continuously reducing distance between adjacent tracks, as said head means moves from said innermost track to said outermost track.

* * * * *